(12) United States Patent
Kim et al.

(10) Patent No.: US 11,613,236 B2
(45) Date of Patent: Mar. 28, 2023

(54) FOLDABLE ELECTRONIC PEDAL APPARATUS

(71) Applicants: Hyundai Motor Company, Seoul (KR); Kia Corporation, Seoul (KR); Kyung Chang Industrial Co., Ltd., Daegu (KR)

(72) Inventors: Eun Sik Kim, Gwangmyeong-si (KR); Hyeon Uk Kim, Daegu (KR); Ji Soo Kim, Daegu (KR); Jong Hwan Han, Daegu (KR)

(73) Assignees: HYUNDAI MOTOR COMPANY, Seoul (KR); KIA CORPORATION, Seoul (KR); KYUNG CHANG INDUSTRIAL CO., LTD., Daegu (KR)

( * ) Notice: Subject to any disclaimer, the term of this patent is extended or adjusted under 35 U.S.C. 154(b) by 0 days.

(21) Appl. No.: 17/840,782

(22) Filed: Jun. 15, 2022

(65) Prior Publication Data
US 2023/0055436 A1    Feb. 23, 2023

(30) Foreign Application Priority Data
Aug. 19, 2021    (KR) .................. 10-2021-0109719

(51) Int. Cl.
*G05G 1/30* (2008.04)
*B60T 7/06* (2006.01)
(Continued)

(52) U.S. Cl.
CPC ............ *B60T 7/065* (2013.01); *B60K 26/021* (2013.01); *B60T 7/042* (2013.01); *B60K 2026/026* (2013.01)

(58) Field of Classification Search
CPC .. G05G 1/30; G05G 1/32; G05G 1/36; G05G 1/38; G05G 1/40; G05G 1/405; G05G 1/44; G05G 1/45; B60K 26/02; B60K 26/021; B60K 2026/026; B60K 2026/024; B60K 2026/046; B60K 2026/022;
(Continued)

(56) References Cited

U.S. PATENT DOCUMENTS 6,182,525 B1   2/2001   Bowers et al.
9,283,934 B2   3/2016   Shand
(Continued)

FOREIGN PATENT DOCUMENTS

DE   102010063409 A1 *   6/2012   ........... B60K 26/021
DE   102011054655 A1 *   4/2013   ........... B60K 26/021
(Continued)

OTHER PUBLICATIONS

Machine Translation of FR-2846759-A1.*
(Continued)

*Primary Examiner* — Brian J McGovern
(74) *Attorney, Agent, or Firm* — Morgan, Lewis & Bockius LLP (57) ABSTRACT

A foldable electronic pedal apparatus is proposed. The foldable electronic pedal apparatus has both a foldable function that can pop up and hide the pedal and an electronic pedal function, and can tune necessary pedal effort, stroke, and hysteresis that are different for every kind of vehicle by having a high-load spring module and a hysteresis lever.

17 Claims, 11 Drawing Sheets

(51) Int. Cl.
 *B60T 7/04* (2006.01)
 *B60K 26/02* (2006.01)

(58) Field of Classification Search
 CPC ..... B60K 2026/023; B60T 7/04; B60T 7/042; B60T 7/06; B60T 7/065; B60R 21/09
 See application file for complete search history.

(56) References Cited

U.S. PATENT DOCUMENTS

| | | | |
|---|---|---|---|
| 10,906,514 B1 * | 2/2021 | Kim | G05G 5/03 |
| 10,946,741 B1 * | 3/2021 | Kim | B60T 7/06 |
| 11,021,058 B1 * | 6/2021 | Kim | G05G 5/28 |
| 11,052,856 B1 * | 7/2021 | Kim | B60R 21/09 |
| 11,225,226 B1 * | 1/2022 | Kim | B60T 7/042 |
| 11,249,506 B1 * | 2/2022 | Kim | G05G 5/28 |
| 11,327,520 B1 * | 5/2022 | Kim | G05G 5/05 |
| 2004/0259687 A1 * | 12/2004 | Ritter | B60K 26/021 |
| | | | 477/187 |
| 2005/0011493 A1 * | 1/2005 | Reimann | B60K 26/021 |
| | | | 74/513 |
| 2008/0141820 A1 * | 6/2008 | Park | G05G 5/03 |
| | | | 74/513 |
| 2008/0147287 A1 * | 6/2008 | Park | B60W 50/16 |
| | | | 701/70 |
| 2011/0260557 A1 * | 10/2011 | Noh | B60K 26/021 |
| | | | 310/12.04 |
| 2013/0047776 A1 | 2/2013 | Leone et al. | |
| 2018/0253120 A1 * | 9/2018 | Kim | G05G 1/44 |
| 2019/0160943 A1 * | 5/2019 | Kadoi | B60K 26/02 |
| 2019/0163227 A1 * | 5/2019 | Kadoi | G05G 5/05 |
| 2022/0048384 A1 * | 2/2022 | Kim | G05G 5/28 |
| 2022/0055477 A1 * | 2/2022 | Kim | G05G 1/44 |
| 2022/0379852 A1 * | 12/2022 | O'Neill | B60T 7/042 |
| 2023/0001788 A1 * | 1/2023 | Hariu | B60K 26/02 |

FOREIGN PATENT DOCUMENTS

| | | | | |
|---|---|---|---|---|
| EP | 3031653 A1 * | 6/2016 | ........... | B60K 26/021 |
| FR | 2846759 A1 * | 5/2004 | ........... | B60K 26/021 |
| KR | 10-1710964 B1 | 3/2017 | | |
| KR | 10-2077687 B1 | 4/2020 | | |
| KR | 10-2020-0070946 A | 6/2020 | | |

OTHER PUBLICATIONS

Machine Translation of EP-3031653-A1.*
Machine Translation of DE-102011054655-A1.*
Machine Translation of DE-102010063409-A1.*
Machine Translation of KR-10-2077687.*

* cited by examiner

FOLDABLE ELECTRONIC PEDAL APPARATUS

CROSS REFERENCE TO RELATED APPLICATION

The present application claims the benefit of priority to Korean Patent Application No. 10-2021-0109719, filed on Aug. 19, 2021 in the Korean Intellectual Property Office, the entire contents of which is incorporated herein for all purposes by reference.

BACKGROUND

Technical Field

The present disclosure relates to a foldable electronic pedal apparatus and, more particularly, a foldable electronic pedal apparatus that has both a foldable function and an electronic pedal function.

Description of the Related Art

A self-driving vehicle is a smart vehicle that goes to a destination by itself even though a driver does not manually operate a steering wheel, an accelerator pedal, a brake, etc.

When a self-driving situation is generally implemented, drivers can select a self-driving mode, in which a vehicle goes to a destination by itself, without manually driving.

A driver should be able to take a rest in a comfortable position with his or her legs stretched in the self-driving mode. However, if pedals (the accelerator pedal and the brake pedal) disposed in the space under the driver seat are exposed in the interior, they interfere with the driver taking a rest or an accident may be caused by unexpected misoperation of the pedals.

Therefore, it is required to develop a pedal apparatus that exposes a pedal pad toward a driver such that a driver can operate the pedal pad in the manual driving mode in which the driver manually drives, and that hides the pedal pad such that the driver cannot operate the pedal pad for a comfortable rest of the driver and safety such as prevention of misoperation in the self-driving situation.

Further, it is possible to use an electronic pedal apparatus having no mechanical connection structure between a pedal and an acceleration system or a pedal and a brake system in smart vehicles that can perform self-driving.

The foregoing is intended merely to aid in the understanding of the background of the present disclosure, and is not intended to mean that the present disclosure falls within the purview of the related art that is already known to those skilled in the art.

SUMMARY

According to various embodiments of the present disclosure, a foldable electronic pedal apparatus, which has both a foldable function and an electronic pedal function, may be enabled to be used for a self-driving vehicle.

According to various embodiments of the present disclosure a pedal apparatus that can improve a feeling of operation for a driver and minimize fatigue of an ankle may be realized because it is configured in an organ type, that can tune necessary pedal effort, stroke, and hysteresis operation force that are different for every kind of vehicle by having a high-load spring module and a hysteresis lever, and thus, that can contribute to reducing costs and decreasing a package size and a manufacturing cost by simplifying the configuration.

According to one embodiment of the present disclosure, a foldable electronic pedal apparatus includes: a pedal housing; a pedal pad rotatably coupled to the pedal housing through a hinge pin and configured to be operated by a driver; a stroke sensor fixed to the pedal housing, connected to the pedal pad, and configured to generate a signal relating to a pedal function when the pedal pad rotates; an actuator fixed to the pedal housing and configured to generate power for a popped-up state or a hidden state of the pedal pad; and a link mechanism and a spring module installed to connect the pedal pad and the actuator to each other.

The foldable electronic pedal apparatus may further include a PCB fixed to the pedal housing and having a function of controlling operation of the actuator.

The pedal pad may have: a pad part having a box shape including a pad surface that is operated by a foot of a driver; and a pedal arm having an end connected to the pad part and another end to which a hinge pin is coupled, and connected to the stroke sensor.

The pedal housing may include a housing hole through which the pad part passes; and when the pedal pad rotates by power from the actuator and the pad part protrudes out of the pedal housing through the housing hole, the popped-up state in which the pedal pad can be operated by a driver may be implemented.

A housing hole through which the pad part passes may be included in the pedal housing; and when the pedal pad rotates by power from the actuator and the pad part is inserted into the pedal housing through the housing hole, the hidden state in which the pedal pad is not exposed to a driver may be implemented.

The link mechanism may include: a rotary lever coupled to be rotatable on a lever pin with respect to the pedal housing between the pedal pad and the spring module and having a front end to which a lower end of the spring module is rotatably coupled; a connection link rotatably coupled and connecting the pad part and a rear end of the rotary lever; and a spring link rotatably coupled and connecting an upper end of the spring module and a gear member configured to transmit power from the actuator.

The foldable electronic pedal apparatus may further include a stopper protrusion protruding inward from a front surface of the pedal housing, in which the stopper protrusion may limit a popped-up state position of the pedal pad by coming in contact with the spring link when the pedal pad pops up.

When a central axis connecting centers of upper and lower ends of the spring module and a link axis connecting the center of the lower end of the spring module and a center of an upper end of the spring link are defined with the spring link in contact with the stopper protrusion, the center of the upper end of the spring module may be biased to the stopper protrusion more than the center of the upper end of the spring link.

The foldable electronic pedal apparatus may further include a hysteresis lever elongated along the rotary lever and having an end rotatably coupled to a lower end of the connection link and another end at which a friction portion covering the lever pin in an arc shape in contact with the lever pin is disposed, in which an end of the friction portion may be rotatably coupled to the rotary lever.

The hysteresis lever may include a plastic material elongated straight and having elasticity.

The friction portion of the hysteresis lever may be maintained to be in contact with the lever pin by spring force of the spring module.

When the pedal pad is operated and rotated by a driver and the pad part rotates into the pedal housing, the hysteresis lever may receive rotation of the pad part through the connection link and rotate about a point where the hysteresis lever and the rotary lever are coupled; and when the hysteresis lever rotates, hysteresis may be generated by friction force that is generated by contact between the friction portion of the hysteresis lever and the lever pin.

The lower end of the connection link and the rear end of the rotary lever may be coupled by fitting link protrusions disposed at the connection link into lever holes included in the rotary lever; and a diameter of the lever holes may be larger than a diameter of the link protrusions.

When the pedal pad is normally operated and rotated by a driver, the link protrusions may be moved in the lever holes, so that friction force at the friction portion of the hysteresis lever may be increased by elastic deformation of the hysteresis lever, whereby hysteresis may increase.

When the pedal pad rotates in a state in which spring force of the spring module is abnormally large or the shape of the hysteresis lever is excessively deformed, the link protrusions may come in contact with lower portions of the lever holes, whereby excessive rotation of the hysteresis lever may be prevented.

The pedal pad may have an organ type structure in which a lower end of the pedal arm is rotatably coupled to a lower portion of a rear end of the pedal housing through the hinge pin and the pad part at an upper portion thereof rotates forward and rearward on the hinge pin at a lower portion.

The foldable electronic pedal apparatus may be used as an acceleration pedal apparatus or a brake pedal apparatus.

The foldable electronic pedal apparatus according to the present disclosure described above has both a foldable function that can pop up and hide the pedal and an electronic pedal function, so there is an effect that the pedal apparatus can be usefully used for self-driving vehicles.

Further, there is an effect that the pedal apparatus can improve a feeling of operation for a driver and minimize fatigue of an ankle because it is configured in an organ type, can tune necessary pedal effort, stroke, and hysteresis operation force that are different for every kind of vehicle by having a high-load spring module and a hysteresis lever, and thus, can contribute to reducing costs and decreasing a package size and a manufacturing cost by simplifying the configuration.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION

In the following description, the structural or functional description specified to exemplary embodiments according to the concept of the present disclosure is intended to describe the exemplary embodiments, so it should be understood that the present disclosure may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present disclosure are not limited to the embodiments which will be described hereinbelow with reference to the accompanying drawings, but all modifications, equivalents, and substitutions are included in the scope and spirit of the present disclosure.

It will be understood that, although the terms first, second, etc. may be used herein to describe various elements, these elements should not be limited by these terms. These terms are only used to distinguish one element, from another element. For instance, a first element discussed below could be termed a second element without departing from the right range of the present disclosure. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it should to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

Terms used in the present disclosure are used only in order to describe specific exemplary embodiments rather than limiting the present disclosure. Singular forms are intended to include plural forms unless the context clearly indicates otherwise. It will be further understood that the terms "comprises" or "have" used in this specification specify the presence of stated features, numerals, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present disclosure belongs. It must be understood that the terms defined by the dictionary are identical with the meanings within the context of the related art, and they should not be ideally or excessively formally defined unless the context clearly dictates otherwise.

A control unit (controller) according to exemplary embodiments of the present disclosure can be implemented through a nonvolatile memory (not shown) configured to store algorithms for controlling operation of various components of a vehicle or data about software commands for executing the algorithms, and a processor (not shown) configured to perform operation to be described below using the data stored in the memory. The memory and the processor may be individual chips. Alternatively, the memory and the processor may be integrated in a single chip. The processor may be implemented as one or more processors.

A foldable electronic pedal apparatus according to embodiments of the present disclosure is described hereafter in detail with reference to the accompanying drawings.

A foldable electronic pedal apparatus according to the present disclosure is applied to a self-driving vehicle and has a foldable function that enables a pedal pad to pop up so that a driver can operate the pedal pad in a manual driving module in which the driver manually drives, and that hides the pedal pad so that the driver cannot operate the pedal pad for a comfortable rest of the driver and safety such as prevention of mis-operation in a self-driving situation.

A pedal apparatus according to the present disclosure is an electronic system that operates an acceleration system or a brake system by generating signals when a pedal pad is operated.

A foldable electronic pedal apparatus according to the present disclosure, as shown in FIGS. 1 to 11, includes: a pedal housing 100 installed and fixed in the space under and ahead of a driver seat; a pedal pad 300 coupled to the pedal housing 100 to be able to rotate forward and rearward through a hinge pin 200 and configured to be operated by a driver; a stroke sensor 400 fixed to the pedal housing 100, connected to the pedal pad 300, and generating a signal relating to a pedal function when the pedal pad 300 rotates; an actuator 500 fixed to the pedal housing 100 and generating power for a popped-up state or a hidden state of the pedal pad 300; and a link mechanism 600 and a spring module 700 installed to connect the pedal pad 300 and the actuator to each other.

The pedal housing 100 is formed in a hollow box shape and has two side covers 100 that can be separably coupled, and the pedal pad 300, the stroke sensor 400, the actuator 500, the link mechanism 600, the spring module, and a Printed Circuit Board (PCB), a hysteresis lever, etc. which are described below are installed in the pedal housing 100.

The pedal pad 300 includes: a pad part 310 having a pad surface 311, which is operated by a foot of a driver, and formed in a box shape; and a pedal arm 320 having an end connected to the pad part 310 and another end coupled to the hinge pin 200, and connected to the stroke sensor 600.

The pad part 310 and the pedal arm 320 are connected in an L shape when seen from a side, whereby an organ-type pedal apparatus can be achieved.

That is, the pedal pad 300 has an organ type structure in which the lower end of the pedal arm 320 is rotatably coupled to the lower portion of the rear end of the pedal housing 100 through the hinge pin 200 and the pad part 310 at the upper portion thereof rotates forward and rearward on the hinge pin 200 at the lower portion. The organ type structure has an advantage that when a driver operates the pad part, convenience can be improved, a feeling of operation can be improved, and fatigue of an ankle can be minimized, as compared with a pendant type.

The pad part 310 is inserted into the pedal housing 100 or protruded out of the pedal housing 100 through a housing hole 120 formed at the pedal housing 100 when the pedal pad 300 rotates. The pedal arm 320 is positioned in the pedal housing 100 regardless of rotation of the pedal pad 300.

According to the pedal pad 300, the lower end of the pedal arm 320 is coupled to be able to rotate forward and rearward on the hinge pin 200 with respect to the pedal housing 100, the pad part 310 spaced upward apart from the hinge pin 200 is inserted into the pedal housing 100 through the housing hole 120 formed at the pedal housing 100 when the pedal arm 320 rotates forward, and the pad part 310 is protruded and exposed toward a driver from the pedal housing 100 when the pedal arm 320 rotates rearward.

The top and the bottom of the pad part 310 are formed in an arc shape that is the same as the route of the rotation radius of the pedal pad 300 around the hinge pin 200, so the gap from the housing hole 120 formed at the pedal housing 100 can be maintained, whereby entrance of foreign substances can be maximally prevented.

The pad part 310 is installed to pass through the housing hole 120 formed at the pedal housing 100, so the pad part 310 is inserted into the pedal housing 100 or protruded out of the pedal housing 100 when the pedal pad 300 rotates. The pedal arm 320 is positioned in the pedal housing 100 regardless of rotation of the pedal pad 300, so contact with a driver is prevented.

Accordingly, when a driver operates the pedal pad 300 with a foot, the driver can operate only the pad surface 311 of the pad part 310 exposed out of the pedal housing 100. Further, since the pedal arm 320 positioned in the pedal housing 100 is not touched by the driver's foot, so it is not operated, whereby mis-operation by the driver can be prevented.

Figure 2:
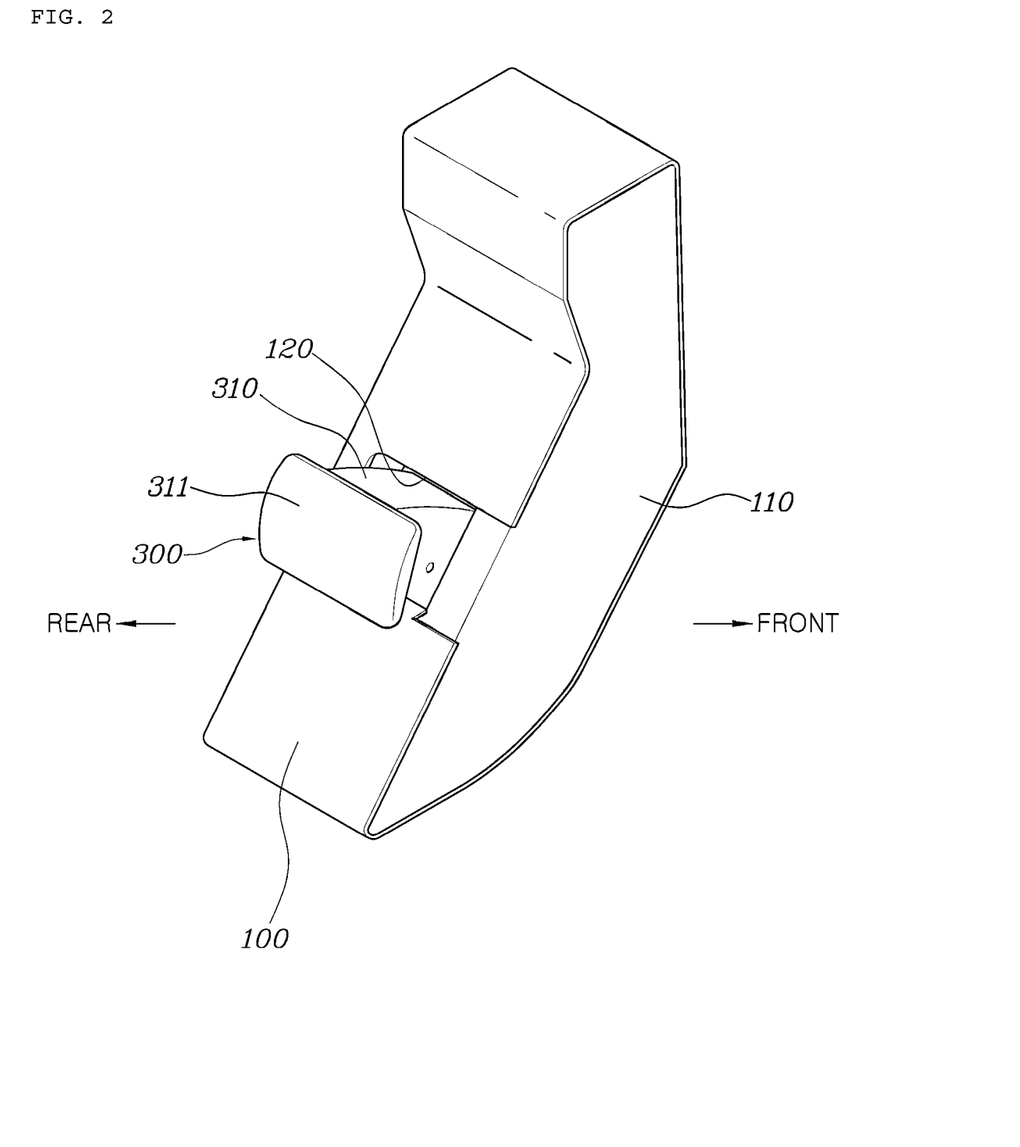
FIG. 2 is an assembly view of FIG. 2 in which a pedal pad has popped up.
Figure 3:
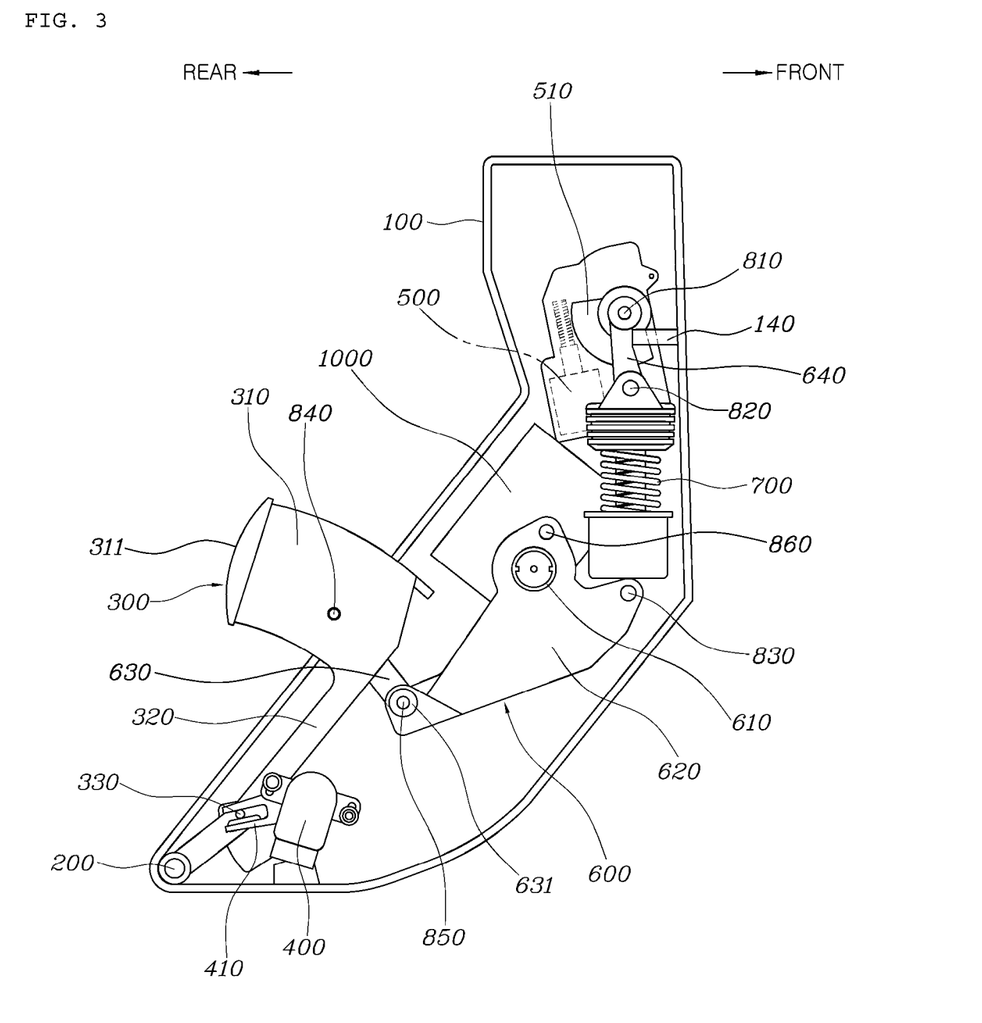
FIG. 3 is a side view of FIG. 1 which shows the internal structure of the pedal apparatus of the present disclosure.
Figure 4:
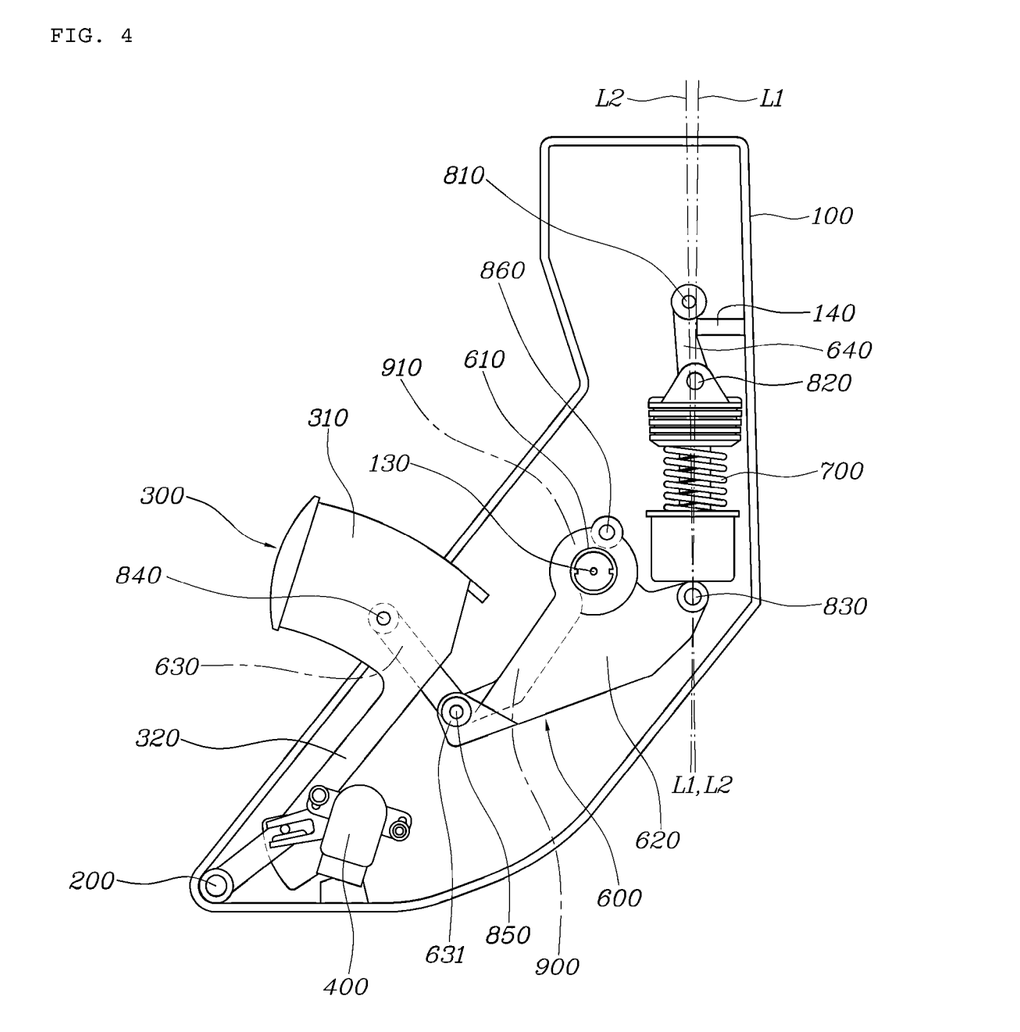
FIG. 4 is a view showing the state in which an actuator and a PCB have been removed from FIG. 3.
Figure 5:
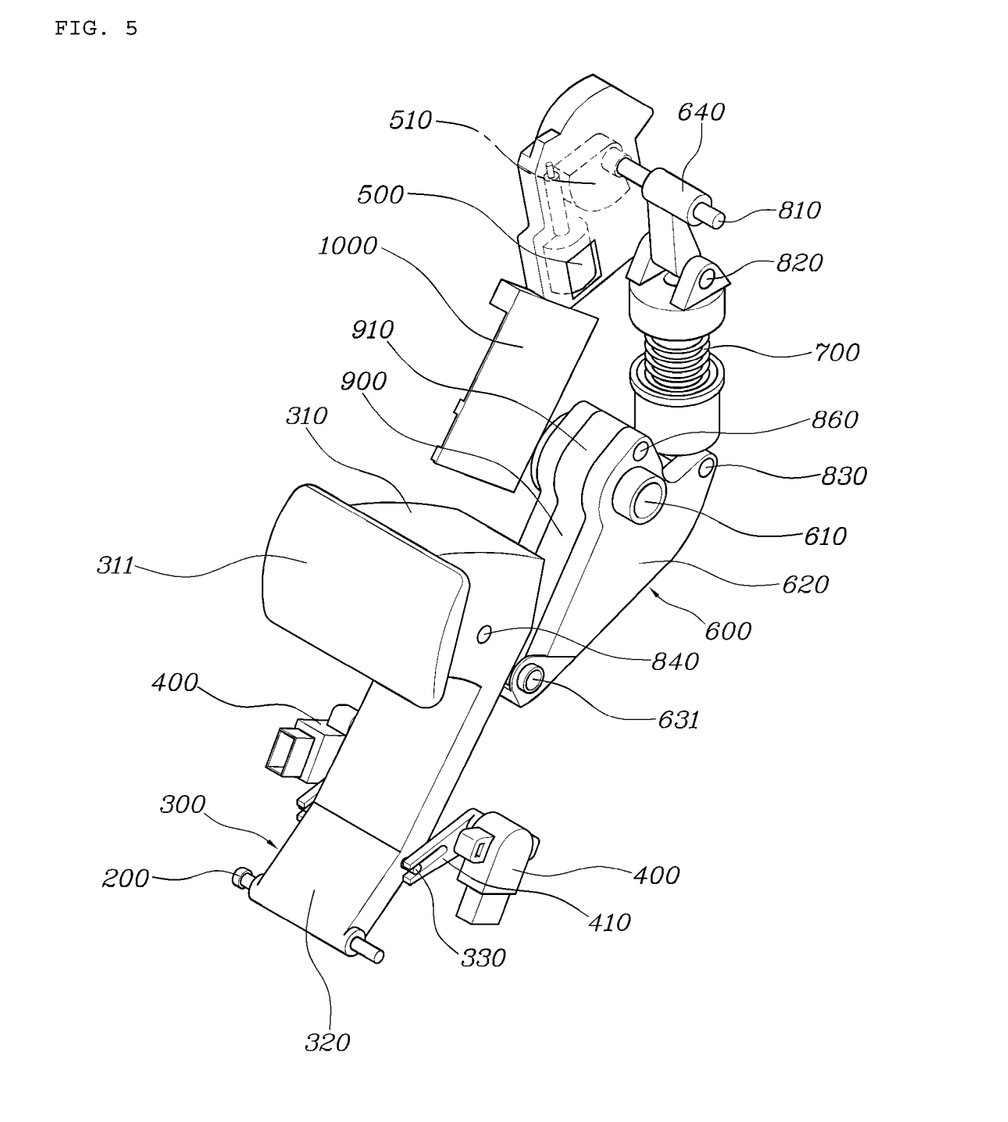
FIG. 5 is a perspective view showing the state in which a pedal housing has been removed from FIG. 3.
Figure 6:
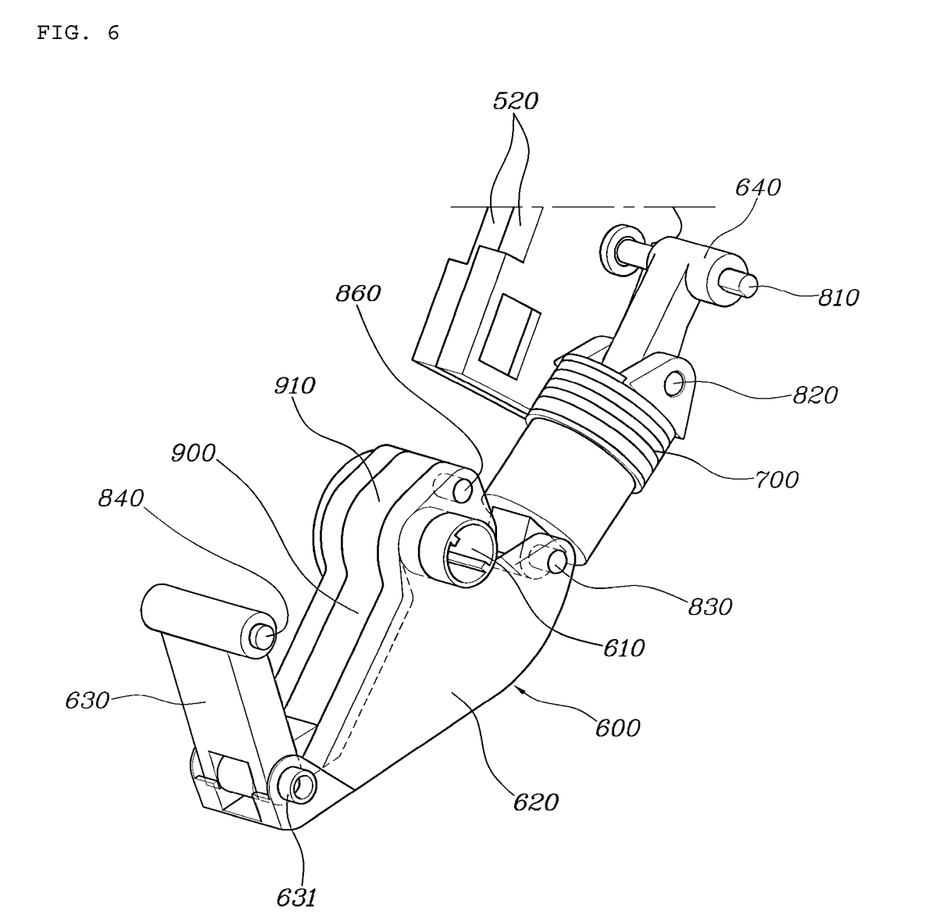
FIG. 6 is an enlarged view of a link mechanism and a spring module of FIG. 5.

When the pedal pad 300 rotates by power from the actuator 500 and the pad part 310 protrudes out of the pedal housing 100 through the housing hole 120, the pedal pad 300 enters the popped-up state in which it can be operated by a driver (see FIGS. 2 to 4). On the contrary, when the pad part 310 is inserted into the pedal housing 100 through the housing hole 120, the pedal pad 300 enters the hidden-state in which it is not exposed toward a driver (see FIG. 11). Therefore, the pedal apparatus according to the present disclosure can achieve a foldable function when the actuator 500 is operated.

The lower end of the pedal arm 320 of the pedal pad 300 is rotatably coupled to the lower portion of the rear of the pedal housing 100 through the hinge pin 200, the actuator 500 is installed in the front upper portion of the pedal housing 100, and the link mechanism 600 and the spring module 700 are installed to connect the actuator 500 and the pad part 310 of the pedal pad 300 to each other.

The stroke sensor 400 has a sensor lever 410 and the sensor lever 410 is coupled to a sensor pin 330 of the pedal pad 300. When the pedal pad 300 rotates with respect to the pedal housing 100, the sensor lever 410 rotates on the sensor pin 330.

The sensor pin 330 is positioned above the hinge pin 200 coupled to the pedal arm 320 and protrudes from both sides of the pedal arm 320.

The sensor pin 330 protrudes from both sides of the pedal arm 320 between the pad part 310 and the hinge pin 200.

Since the pedal arm 320 has the sensor pin 330, the stroke sensor 400 can be positioned close to the pedal arm 320, so the entire size can be reduced.

The stroke sensor 400 serves to detect whether the pedal pad 300 returns to the initial position when the pedal pad 300 rotates and to detect rotation of the pedal pad 300 when a driver depresses the pedal pad 300.

The stroke sensor 400 includes a permanent magnet and a PCB disposed to face the permanent magnet. Accordingly, when the pedal pad 300 rotates by a driver, the stroke sensor 400 detects the rotation angle of the pedal pad 300 on the basis of a change of the magnitude of a magnetic field due to a position change of the permanent magnet, and generates a signal related to the pedal function.

The stroke sensor 400 may be any one of an Accelerator Position Sensor (APS) that generates a signal related to acceleration and a Brake Position Sensor (BPS) that generates a signal related to braking.

Accordingly, the electronic pedal apparatus according to the present disclosure may be used as any one of an acceleration pedal apparatus or a brake pedal apparatus or may be used as both an acceleration pedal apparatus and a brake pedal apparatus.

The stroke sensor 400 according to an embodiment of the present disclosure is a contact type sensor that is connected to the pedal pad 300 through the sensor lever 410 that is a mechanical structure, but, if necessary, it may be a non-contact type sensor composed of only a permanent magnet and a PCB.

The actuator 500 may be a rotary type motor, a motor shaft is formed as a worm gear, the worm gear is engaged with a gear member 510, and the gear member 510 is coupled to a spring link of the link mechanism 600. Accordingly, the power from the actuator 500 can be transmitted to the spring link of the link mechanism 600 through the gear member 510.

The actuator 500 and the gear member 510 are covered and protected by a housing 520, and the housing 520 is fixed to the pedal housing 100.

The link mechanism 600 includes: a rotary lever 620 coupled to be rotatable on a lever pin 610 with respect to the pedal housing 100 between the pedal pad 300 and the spring module 700 and having a front end to which the lower end of the spring module 700 is rotatably coupled; a connection link 630 rotatably coupled and connecting the pad part 310 and the rear end of the rotary lever 620; and a spring link 640 rotatably coupled and connecting the upper end of the spring module 700 and the gear member 510 transmitting the power from the actuator 500.

A lever shaft 130 is disposed on a side of the pedal housing 100 and the lever pin 610 is fitted on the lever shaft 130 and fitted in the rotary lever 620.

The rotary lever 620 has holes in which the lever pin 610 is fitted between the rear end and the front end, so the lever pin 610 is fitted in the holes. The lower end of the spring module 700 is rotatably coupled to the front end with respect to the fitted lever pin 610 and the lower end of the connection link 630 is rotatably coupled to the rear end.

An end of a first pin 810 is rotatably coupled to the upper end of the spring link 640 and another end of the first pin 810 is rotatably coupled to the gear member 510 after passing through the housing 520.

The lower end of the spring link 640 is rotatably coupled to the spring module 700 through a second pin 820. The lower end of the spring module 700 is rotatably coupled to the front end of the rotary lever 620 through a third pin 830.

According to the present disclosure, a stopper protrusion 140 protruding inward is formed on the front surface of the pedal housing 100. The stopper protrusion 140, as shown in FIG. 4, comes in contact with the spring link 640 when the pedal pad 300 pops up, thereby limiting the popped-up state position of the pedal pad 300.

That is, the stopper protrusion 140 comes in contact with the spring link 640 when the pedal pad 300 rotates into the popped-up state from the hidden state, thereby limiting the popped-up state position of the pedal pad 300.

When a central axis L1 connecting the centers of the upper and lower ends of the spring module 700 and a link axis L2 connecting the center of the lower end of the spring module 700 and the center of the upper end of the spring link 640 are defined with the spring link 640 in contact with the stopper protrusion 140, as shown in FIG. 4, the center of the upper end of the spring module 700, that is, the center of the second pin 820 is biased to the stopper protrusion 140 more than the center of the upper end of the spring link 700, that is, the center of the first pin 810, which is a structural characteristic of the present disclosure.

As described above, when the center of the second pin 820 is biased to the stopper protrusion 140 more than the center of the first pin 810 with the spring link 640 in contact with the stopper protrusion 140, a force is applied to the spring link 640 such that the spring link 640 is supported toward the stopper protrusion 140 by load that is generated when a driver operates the pedal pad 300, whereby the load generated when the pedal pad 300 is operated is not transmitted to the actuator 500. Accordingly, there is an advantage that the durability of the actuator 500 and the gear member 510 can be improved.

The spring module 700, which is a high-load spring module, is installed in the up-down direction at a front portion in the pedal housing 100. The upper end of the spring module 700 is rotatably coupled to the lower end of the spring link 640 and the lower end thereof is rotatably coupled to the front end of the rotary lever 620 through the third pin 830.

High load is required for safety when an automotive pedal apparatus is operated. To this end, the high-load spring module 700 is used in an embodiment of the present disclosure, whereby it is possible to achieve required pedal effort using the high-load spring module 700.

The high-load spring module 700, in general, may be composed of two or more springs and two or more dampers that are arranged in series to achieve pedal effort.

The pedal apparatus according to the present disclosure further includes a hysteresis lever 900 that generates hysteresis when the pedal pad 300 rotates.

The hysteresis lever 900 is elongated along the rotary lever 620. An end of the hysteresis lever 900 is rotatably coupled to the lower end of the connection link 630 and another end thereof is a friction portion 910 covering the lever pin 610 in an arc shape in contact with the lever pin 610. The end of the friction portion 910 is rotatably coupled to the rotary lever 620.

That is, the upper end of the connection link 630 is inserted in the pad part 310 of the pedal pad 300 and rotatably coupled through a fourth pin 840. The lower end of the connection link 630 and the rear end of the hysteresis lever 900 are rotatably coupled to each other through a fifth pin 850.

The lower end of the connection link 630 is formed in a U-shaped groove shape. The rear end of the hysteresis lever 900 is inserted in the groove and then the lower end of the connection link 630 and the rear end of the hysteresis lever 900 are coupled to each other through the fifth pin 850.

A hole through which the fifth pin 500 passes is formed at the lower end of the connection link 630 and the rear end of the hysteresis lever 900. The holes formed at the lower end of the connection link 630 and the rear end of the hysteresis lever 900 are all formed in perfect circles of which the diameters are the same as the diameter of the fifth pin 850.

Link protrusions 631 protruding from both sides of the connection link 630 are formed at the lower end of the connection link 630, and lever holes 621 in which the link protrusions 631 are inserted are formed in U-shaped groove shapes at the rear end of the rotary lever 620.

The lower end of the connection link 630 which is coupled to the rear end of the hysteresis lever 900 by the fifth pin 850 is inserted in the groove at the rear end of the rotary lever 620, and the link protrusions 631 are inserted in the lever holes 621. Accordingly, the lower end of the connection link 630, the rear end of the hysteresis lever 900, and the rear end of the rotary lever 620 are coupled to one another.

The diameter of the lever holes 621 is larger than the diameter of the link protrusions 631, so the link protrusions 631 can be moved in the lever holes 621.

The front end of the hysteresis lever 900 is elongated forward along the rotary lever 620 with the rear end of the hysteresis lever 900 and the lower end of the connection link 630 coupled to each other. The friction portion at the front end of the hysteresis lever 900 covers and is in contact with the outer surface of the lever pin 610 coupled to the rotary lever 620 in an arc shape. The end of the friction portion 910 is rotatably coupled to the rotary lever 620 through a sixth pin 860 outside the lever pin 610.

The hysteresis lever 900 according to the present disclosure is made of a plastic material elongated straight and having elasticity, so it can generate hysteresis using friction force that is generated by contact with the lever pin 610 when the pedal pad 300 is operated. To this end, the friction portion 910 of the hysteresis lever 900 is maintained to be in contact with the lever pin 610 by the spring force of the spring module 700.

Figure 7:
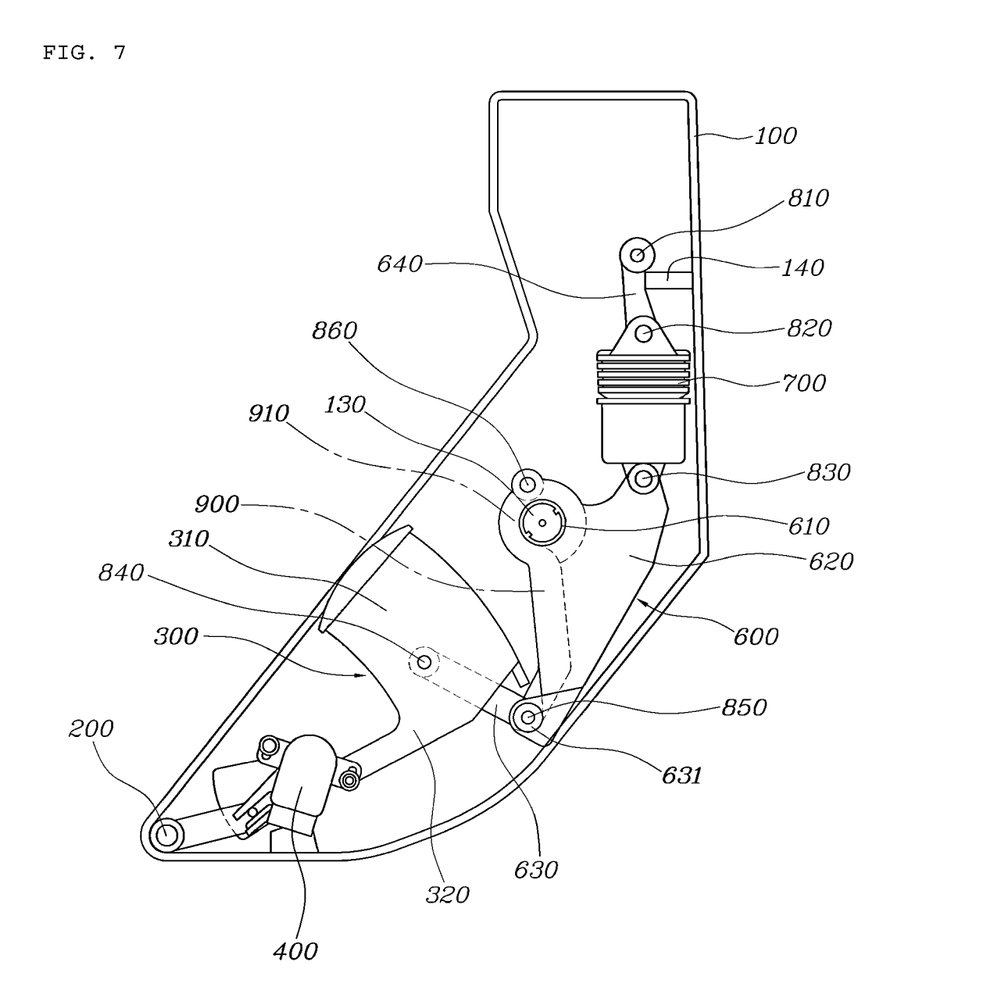
FIG. 7 is a view showing the state in which a pad part has been inserted in a pedal housing by operation of a pedal pad of FIG. 4.

According to the pedal apparatus of the present disclosure, when the pedal pad 300 is operated and rotated by a driver and the pad part 310 rotates into the pedal housing 100, as shown in FIG. 7, in the initial state in which the pad part 310 protrudes out of the pedal housing 100, as shown in FIG. 4, the hysteresis lever 900 receives rotation of the pad part 310 through the connection link 630 and rotates about the point where the hysteresis lever 900 and the rotary lever 620 are coupled, that is, rotates on the sixth pin 860. Further, when the hysteresis lever 900 rotates, hysteresis is generated by the friction force that is generated by contact between the friction portion 910 of the hysteresis lever 900 and the lever pin 610.

Further, according to the pedal apparatus of the present disclosure, since the diameter of the lever holes 621 is larger than the diameter of the link protrusions 631, the link protrusion 631 can be moved in the lever holes 621. Accordingly, when the pedal pad 300 is normally operated and rotated by a driver, the link protrusions 631 are moved in the lever holes 621, so the friction force at the friction portion 910 of the hysteresis lever 900 can be increased by elastic deformation of the hysteresis lever 900. Accordingly, there is an advantage that hysteresis can increase.

Figure 8:
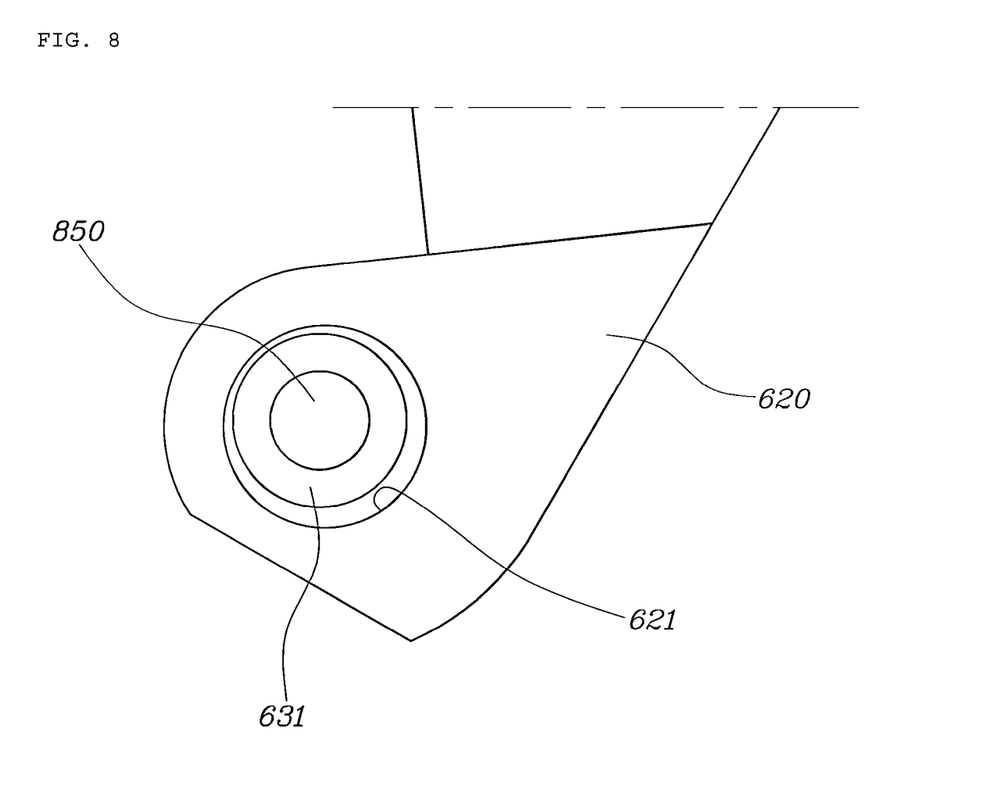
FIGS. 8, 9 and 10 are view illustrating the relationship between a link protrusion of a connection link and a lever hole of a rotary lever in the present disclosure.
Figure 9:
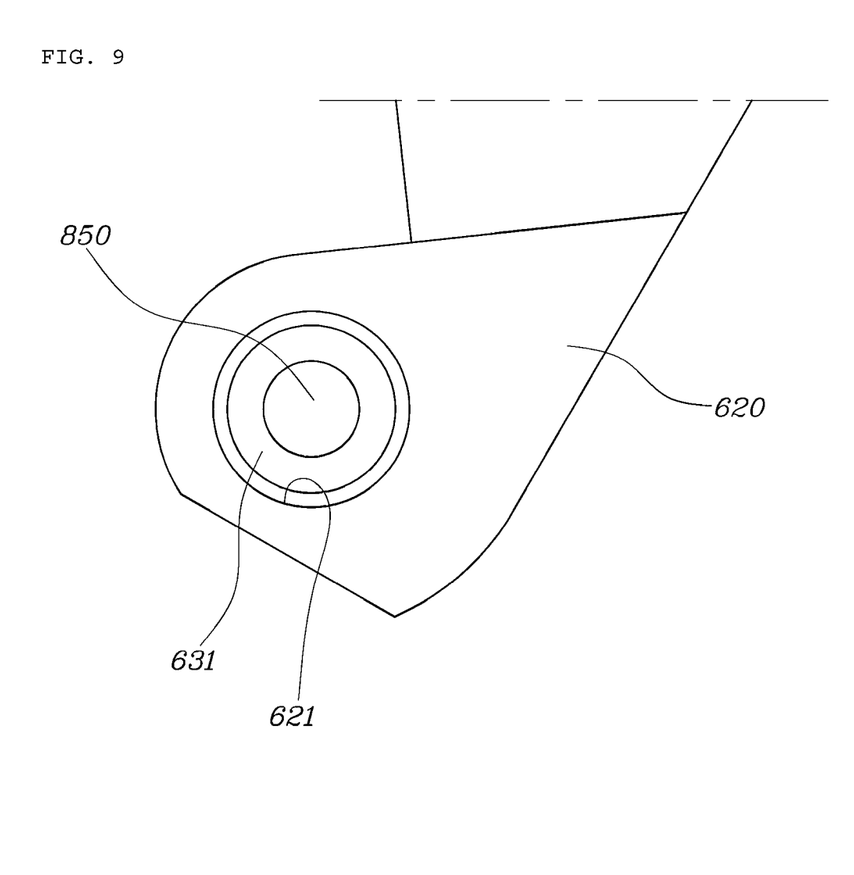
Figure 10:
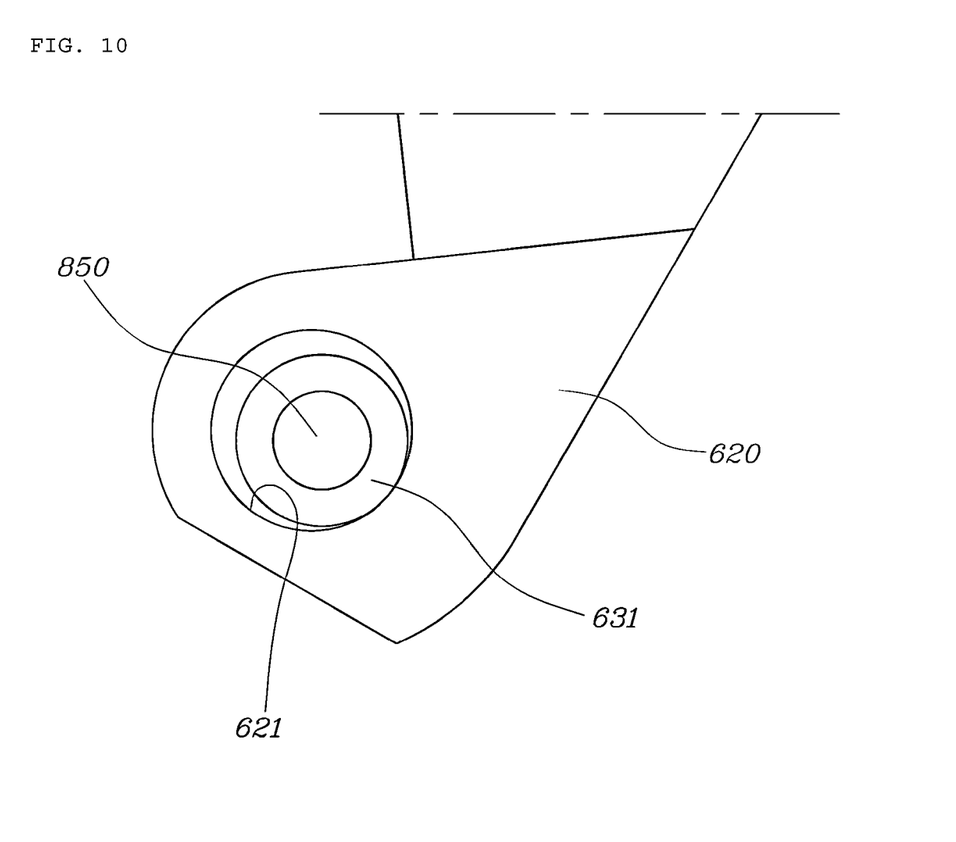

In the initial state in which the pad part 310 protrudes out of the pedal housing 100, as shown in FIG. 4, the link protrusions 631 has been moved upward in the lever holes 621, as shown in FIG. 8, or are positioned at the center in the lever holes 621.

In this state, when the pedal pad 300 is normally operated and rotated by a driver, the link protrusions 631 are moved in the lever holes 621 and the hysteresis lever 900 is elastically deformed. As the hysteresis lever 900 is elastically deformed, the contact force between the friction portion 910 of the hysteresis lever 900 and the lever pin 610 is increased, so the friction force increases. Further, as the friction force increases, hysteresis can increase.

However, when the spring force of the spring module 700 is abnormally large or excessively large (e.g., larger than a predetermined force amount) or the shape of the hysteresis lever 900 is abnormally deformed or excessively deformed (e.g., deformed in a degree greater than a predetermined deformation amount), and the pedal pad 300 rotates in this state, the link protrusions 631 come in contact with the lower portions of the lever holes 621, whereby it is possible to prevent excessive rotation of the hysteresis lever 900. In one embodiment, a "normal" operation or a "normal" rotation of the pedal pad 300 may mean that the spring force of the spring module 700 is smaller than or equal to the predetermined force amount, or mean that the shape of the hysteresis lever 900 is deformed in a degree less than or equal to the predetermined deformation amount.

If the hysteresis lever 900 is excessively rotated when the pedal pad 300 is operated, the contact force between the friction portion 910 and the lever pin 610 excessively increases, so unnecessarily large friction force is generated. In this case, return of the hysteresis lever 900 and return of the pedal pad 300 are delayed, the possibility of a problem with smooth operation of the pedal apparatus increases.

The pedal apparatus according to the present disclosure further includes a PCB 1000 fixed to the pedal housing 100 and having a function of controlling operation of the actuator 700.

The PCB 1000 not only can perform the function of controlling operation of the actuator 700, but can diagnose failure and perform CAN communication with pedal-related parts.

Figure 1:
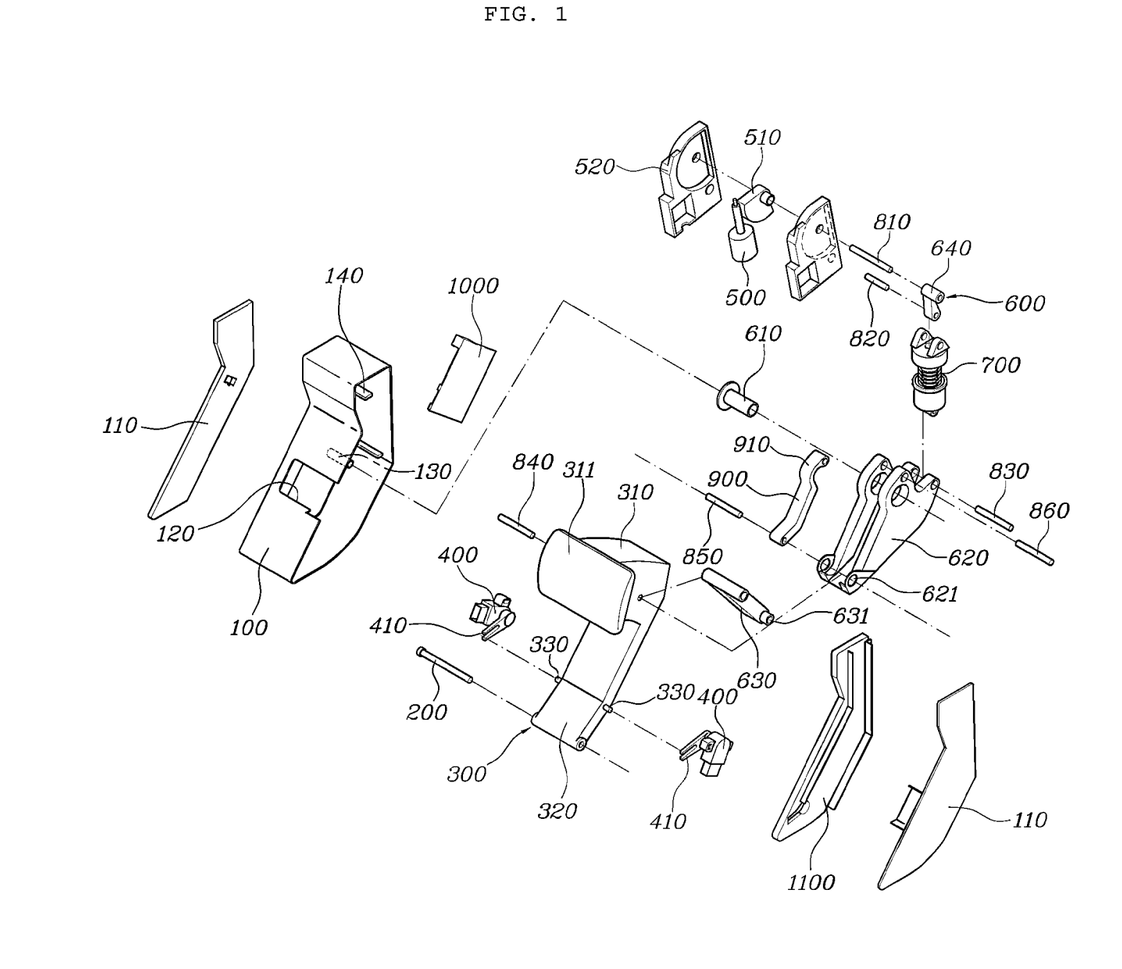
FIG. 1 is an exploded view of a foldable electronic pedal apparatus according to an embodiment of the present disclosure.

The reference numeral '1100' shown in FIG. 1 and not stated above indicates an internal bracket installed to be positioned in the pedal housing 100, and the stroke sensor 400 may be fixed to the internal bracket.

FIGS. 2 to 4 show the popped-up state in which the pad part 310 of the pedal pad 300 protrudes out of the pedal housing 100 through the housing hole 120. In this popped-up state, a driver can manually operate the pedal pad 300.

Figure 11:
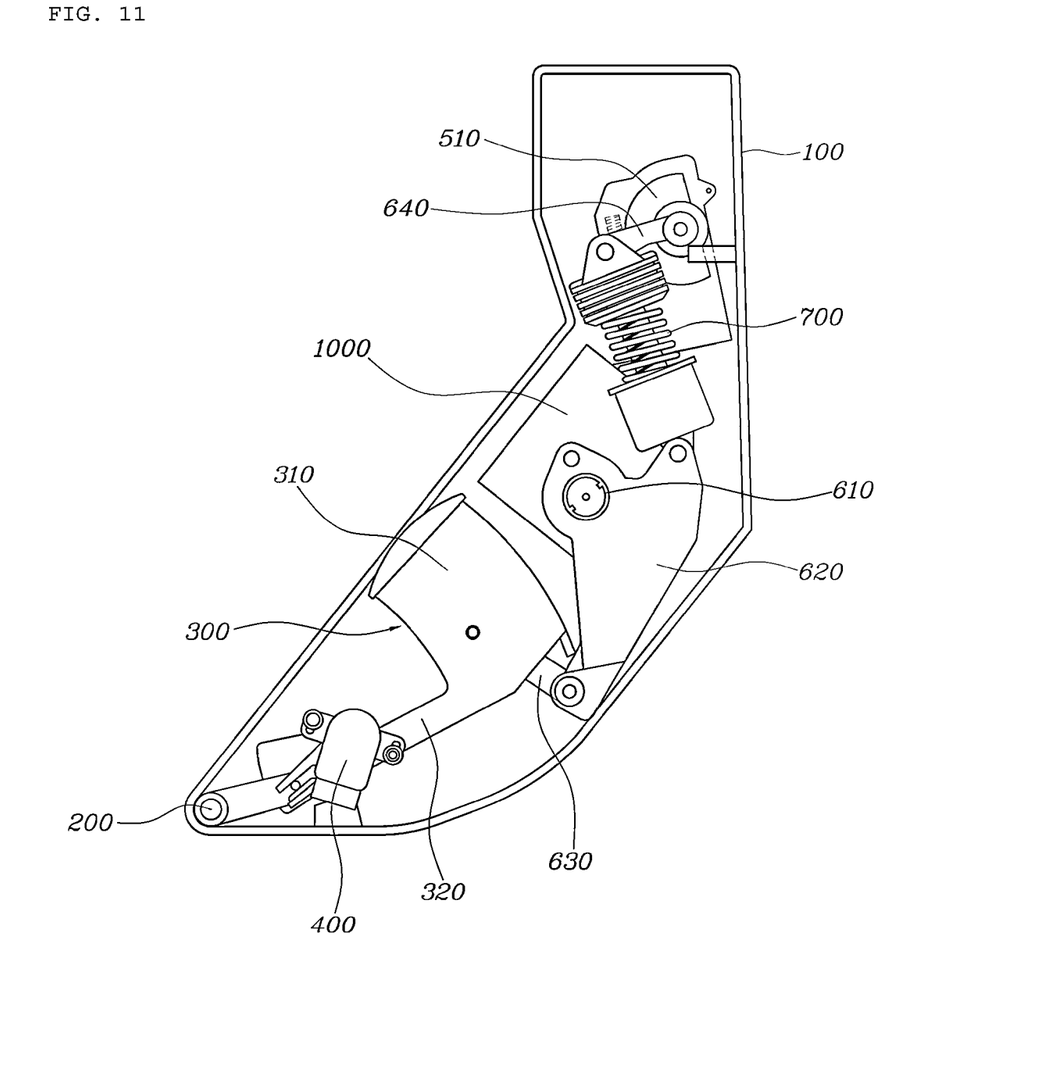
FIG. 11 is a view showing a hidden state in which the pad part has been inserted in the pedal housing by operation of an actuator according to an embodiment of the present disclosure.

FIG. 11 shows the hidden state in which the spring link 640 has been rotated by the power from the actuator 500, the spring module 700 has been pulled up, the rotary lever 620 and the connection link 630 have been pulled, and the pedal pad 300 has been rotated on the hinge pin 200, so the pad part 310 has been inserted in the pedal housing 100 through the housing hole 120.

In the hidden state, the pedal pad 300 is not exposed toward a driver, so the driver cannot operate the pedal pad 300.

The hidden state is implemented in a self-driving mode of a vehicle. When the pedal is hidden, a wide space without interference by the pedal is secured under and ahead of a driver seat, so a driver can take a rest in a comfortable position in a relax mode. Further, mis-operation of the pedal during self-driving is prevented, so it is possible to improve safety.

The foldable electronic pedal apparatus according to the present disclosure described above has both a foldable function that can pop up and hide the pedal and an electronic pedal function, so there is an advantage that the pedal apparatus can be usefully used for self-driving vehicles.

Further, there is an advantage that the pedal apparatus can improve a feeling of operation for a driver and minimize fatigue of an ankle because it is configured in an organ type, can tune necessary pedal effort, stroke, and hysteresis operation force that are different for every kind of vehicle by having a high-load spring module and a hysteresis lever, and thus, can contribute to reducing costs and decreasing a package size and a manufacturing cost by simplifying the configuration.

Although the present disclosure was described with reference to specific embodiments shown in the drawings, it is apparent to those skilled in the art that the present disclosure may be changed and modified in various ways without departing from the scope of the present disclosure which is described in the following claims.

What is claimed is:

1. A foldable electronic pedal apparatus comprising:
a pedal housing;
a pedal pad rotatably coupled to the pedal housing through a hinge pin and configured to be operated by a driver;
an actuator fixed within the pedal housing and configured to generate power to move the pedal pad from an extended state to a retracted state of the pedal pad; and
a rotary lever disposed within the pedal housing and configured to rotate about a lever shaft extending from the pedal housing when the pedal pad rotates; and
a spring module configured to provide reaction force when the pedal pad is pressed by the driver;
a connection link rotatably coupled to the pedal pad and the rotary lever;
a spring link rotatably coupled to the actuator and the spring module.

2. The foldable electronic pedal apparatus of claim 1, further comprising a printed circuit board (PCB) fixed to the pedal housing and having a function of controlling operation of the actuator.

3. The foldable electronic pedal apparatus of claim 1, wherein the pedal pad includes:
a pad part having a box shape including a pad surface that is operated by a foot of the driver; and
a pedal arm having an end connected to the pad part and another end to which the hinge pin is coupled, the pedal arm being connected to a stroke sensor.

4. The foldable electronic pedal apparatus of claim 3, wherein the pedal housing includes a housing hole through which the pad part passes, and
when the pedal pad rotates by power from the actuator and the pad part protrudes out of the pedal housing through the housing hole, the extended state in which the pedal pad is able to be operated by a driver is implemented.

5. The foldable electronic pedal apparatus of claim 3, wherein a housing hole through which the pad part passes is formed at the pedal housing, and
when the pedal pad rotates by power from the actuator and the pad part is inserted into the pedal housing through the housing hole, the retracted state in which the pedal pad is not exposed to the driver is implemented.

6. The foldable electronic pedal apparatus of claim 3, wherein the pedal pad has an organ structure in which a lower end of the pedal arm is rotatably coupled to a lower portion of a rear end of the pedal housing through the hinge pin and the pad part at an upper portion thereof rotates forward and rearward on the hinge pin at a lower portion.

7. The foldable electronic pedal apparatus of claim 1, wherein the actuator is operatively connected to a gear member and the actuator and gear member are disposed within an actuator housing.

8. The foldable electronic pedal apparatus of claim 1, wherein the foldable electronic pedal apparatus is used as an acceleration pedal apparatus or a brake pedal apparatus.

9. A foldable electronic pedal apparatus comprising:
a pedal housing;
a pedal pad rotatably coupled to the pedal housing through a hinge pin and configured to be operated by a driver;
an actuator fixed within the pedal housing and configured to generate power to move the pedal pad from an extended state to a retracted state of the pedal pad; and
a rotary lever disposed within the pedal housing and configured to rotate about a lever shaft extending from the pedal housing when the pedal pad rotates; and
a spring module configured to provide reaction force when the pedal pad is pressed by the driver;
a spring link operatively connecting the actuator to the spring module;
a stopper protrusion protruding inward from a front surface of the pedal housing, the stopper protrusion configured to contact the spring link when the pedal pad is in the extended state.

10. The foldable electronic pedal apparatus of claim 9, wherein, when a central axis connecting centers of upper and lower ends of the spring module and a link axis connecting the center of the lower end of the spring module and a center of an upper end of the spring link are defined with the spring link in contact with the stopper protrusion, the center of the upper end of the spring module is biased to the stopper protrusion more than the center of the upper end of the spring link.

11. A foldable electronic pedal apparatus comprising:
a pedal housing;
a pedal pad rotatably coupled to the pedal housing through a hinge pin and configured to be operated by a driver;
an actuator fixed within the pedal housing and configured to generate power to move the pedal pad from an extended state to a retracted state of the pedal pad; and
a rotary lever disposed within the pedal housing and configured to rotate on a lever pin when the pedal pad rotates; and
a spring module configured to provide reaction force when the pedal pad is pressed by the driver;
a hysteresis lever including a friction portion that engages and generates frictional force with the lever pin when the pedal pad is pressed by the driver.

12. The foldable electronic pedal apparatus of claim 11, wherein the hysteresis lever includes a plastic material elongated straight and having elasticity.

13. The foldable electronic pedal apparatus of claim 11, wherein the friction portion of the hysteresis lever is maintained to be in contact with the lever pin by spring force of the spring module.

14. The foldable electronic pedal apparatus of claim 11, wherein:
when the pedal pad is operated and rotated by the driver and the pad part rotates into the pedal housing, the hysteresis lever receives rotation of the pad part through a connection link and rotates about a point to which the hysteresis lever and the rotary lever are coupled, and
when the hysteresis lever rotates, hysteresis is generated by friction force that is generated by a contact between the friction portion of the hysteresis lever and the lever pin.

15. The foldable electronic pedal apparatus of claim 14, wherein a lower end of the connection link and a rear end of the rotary lever are coupled by fitting link protrusions disposed at the connection link into lever holes included in the rotary lever, and a diameter of the lever holes is larger than a diameter of the link protrusions.

16. The foldable electronic pedal apparatus of claim 15, wherein, when the pedal pad is normally operated and rotated by the driver, the link protrusions are moved in the lever holes, so that friction force at the friction portion of the hysteresis lever is increased by an elastic deformation of the hysteresis lever, whereby hysteresis increases.

17. The foldable electronic pedal apparatus of claim 15, wherein, when the pedal pad rotates in a state, in which spring force of the spring module is abnormally large or the shape of the hysteresis lever is excessively deformed, the link protrusions come in contact with lower portions of the lever holes, whereby excessive rotation of the hysteresis lever is prevented.

* * * * *